US005473117A

United States Patent [19]

[11] Patent Number: 5,473,117

[45] Date of Patent: Dec. 5, 1995

Morgan et al.

[54] FLEXIBLE CABLE GROUNDING SCHEME

[75] Inventors: Douglas V. Morgan, Cary, N.C.; Troy W. Glover, Plano, Tex.

[73] Assignee: Alcatel Network Systems, Inc., Richardson, Tex.

[21] Appl. No.: 198,216

[22] Filed: Feb. 17, 1994

[51] Int. Cl.$^{6}$ .................... H02G 15/068; H02G 15/105

[52] U.S. Cl. .......................... 174/78; 29/860; 174/74 R; 174/75 C; 439/96; 439/98; 439/874; 439/888

[58] Field of Search ........................ 174/74 R, 75 C, 174/78, 36; 29/860; 439/98, 100, 108, 95, 96, 884, 888, 874

[56] References Cited

U.S. PATENT DOCUMENTS

| | | | |
|---|---|---|---|
| 3,280,246 | 10/1966 | Lawson et al. | 174/88 R |
| 4,053,703 | 10/1977 | Smith | 174/78 |
| 4,664,158 | 5/1987 | Sands | 174/117 M |
| 4,684,762 | 8/1987 | Gladfelter | 174/36 |
| 4,776,006 | 10/1988 | Comerford et al. | 379/159 |
| 4,896,000 | 1/1990 | Procter et al. | 174/74 R |
| 4,973,370 | 11/1990 | Kreinberg | 174/74 R |
| 5,015,805 | 5/1991 | Beckloff et al. | 174/75 C |
| 5,028,742 | 7/1991 | Redman | 174/88 R |
| 5,051,543 | 9/1991 | McGuire | 174/78 |
| 5,061,827 | 10/1991 | Grabbe | 75 C/75 C |
| 5,315,063 | 5/1994 | Auclair | 174/78 |

FOREIGN PATENT DOCUMENTS

| | | | |
|---|---|---|---|
| 19291 | 2/1977 | Japan | 174/78 |
| 1022609 | 3/1966 | United Kingdom | 174/78 |

OTHER PUBLICATIONS

"Power Cable Shield Terminator"; Meier, H. E. et al; IBM Technical Disclosure Bulletin; vol. 11 No. 8; Jan. 1969; p. 956.

*Primary Examiner*—Morris H. Nimmo
*Attorney, Agent, or Firm*—Baker & Botts

[57] ABSTRACT

A method for electromagnetically shielding the end of a rigid cable (10) containing a large number of conductors to provide increased bending flexibility is disclosed along with a ground strap assembly (24). Ground strap assembly (24) is designed to shield a cable (10) that consists of a plurality of insulated conductors (18) surrounded by one or more conducting shields (14) (16) and outer insulating sheath (12). A portion of the outer insulating sheath (12) is removed to expose a protruding portion of conducting shield (14). The protruding portion of conducting shield (14) is folded back along a remaining portion of outer insulating sheath (12) thereby exposing the ends of the conductors. Ground strap assembly (24) comprises a braided conducting ground strap (26) that has a cable end portion (32) extending to a central portion (34). Central portion (34) extends to grounding portion (36). The cable end portion (32) is coupled to the protruding portion of the conducting shield (14) of cable (10) that has been folded back. Such coupling shields a portion of the exposed ends of the conductors (18). The central portion (34) of ground strap (26) has an exit opening to allow the exposed conductors (18) to exit from the ground strap (26) thereby allowing the conductors (18) to be flexibly maneuvered and attached to one or more connection points in an electronic device. A ground strap terminal (28) is coupled to the grounding portion (36) of ground strap (26) allowing the ground strap (26) to be attached to ground, thereby shielding the end of the cable from electromagnetic interference.

19 Claims, 2 Drawing Sheets

FLEXIBLE CABLE GROUNDING SCHEME

TECHNICAL FIELD OF THE INVENTION

This invention relates generally to electromagnetic shielding, and more particularly, to a method and apparatus for flexibly shielding the end of a large cable from electromagnetic interference.

BACKGROUND OF THE INVENTION

Large cables used in the telephone industry containing numerous individual conductors present several problems. First, the large size of the cables makes them rigid and inflexible, preventing the cable from being bent in a curve with a tight radius. In addition, bending one of these large cables to form a curve with a tight radius often tears the shielding material surrounding the conductors. This material is used to shield the conductors from electromagnetic interference. In response to these problems, the telephone industry has typically caused the outer sheath of the cable and shielding material to be torn away at the end of the cable so that the individual conductors may be connected to a piece of telephone equipment. Because the shielding material is removed, the exposed end of the cable becomes particularly susceptible to electromagnetic interference.

Attempts to solve this problem have been mostly unsuccessful. Typically, the telephone industry uses heat shrink foil in a curved configuration to attempt to shield the exposed ends of the cable. This method has several drawbacks. First, it is difficult to make a proper electrical connection between the shielding in the cable and the heat shrink foil. In addition, the industry has difficulty making a solid electrical connection between the heat shrink foil and ground in the device to which the cable is attached. The inability to ground successfully the cable shield leads to increased susceptibility to electromagnetic interference.

The industry also attempts to solve this problem by attaching a crimp lug to the end of the shielding material inside the cable and attaching the shield to ground through a wire attached to the crimp lug. This method, although grounding the cable shielding more effectively than the heat shrink foil method, leaves the individual conductors unshielded at the end of the cable, thereby making them more susceptible to electromagnetic interference.

SUMMARY OF THE INVENTION

Therefore, a need has arisen for a way to effectively shield the end of a large cable which allows the cable to be flexible. The present invention provides a method and apparatus that substantially eliminates or reduces disadvantages and problems associated with prior methods and apparatus for shielding large electrical cables.

In particular, a method for shielding the end of a rigid cable with a large number of conductors to provide increased bending flexibility is disclosed wherein the end portion of the outer insulating sheath of the cable is removed to expose a portion of the conducting shield. The exposed portion of the conducting shield then folds back along the remaining portion of the outer insulating sheath thereby exposing the ends of a plurality of insulating conductors. The insulating conductors and the folded back portion of the conducting shield are then surrounded with a braided conducting ground strap having a cable end portion, a central portion and a grounding portion.

The cable end portion secures to the folded back portion of the conducting shield thereby establishing an electrical coupling between the two. Next, the exposed ends of the insulated conductors feed through an exit opening in the central portion of the conducting ground strap allowing the individual conductors to be flexibly maneuvered for easy attachment to one or more connection points in an electrical device. The grounding portion of the conducting ground strap then connects to a grounding conductor thereby properly shielding the plurality of insulated conductors from electromagnetic interference.

An important technical advantage of the present invention is that it allows a large cable to be flexibly maneuvered and bent in a tight radius while still maintaining adequate shielding from electromagnetic interference. In addition, the invention avoids damaging the shielding in the cable when the cable bends. The invention also provides greater flexibility in the way a cable is installed into an electronic device. Moreover, the invention provides a solid electrical connection between the cable shielding and ground, thereby improving suppression of electromagnetic interference on the entire cable.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–8, like numerals being used for like and corresponding parts of the various drawings.

Figure 1:
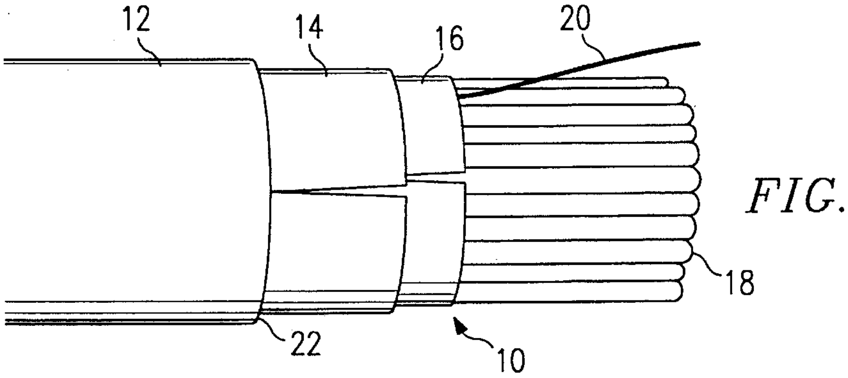
FIG. 1 illustrates a typical large cable with a plurality of individual conductors.

FIG. 1 illustrates a typical large cable, indicated generally at 10, used in the telephone industry. Cable 10 includes outer insulating sheath 12, that normally consists of an insulating material such as hard plastic. Outer insulting sheath 12 surrounds outer shield 14 and inner shield 16. The present invention may also be used with cables having more or less layers of shielding. Outer shield 14 and inner shield 16 are made out of a conducting material for the purpose of providing electromagnetic shielding for a plurality of conductors 18 in cable 10.

In the embodiment illustrated in FIG. 1, outer shield 14 and inner shield 16 consist of foil shielding of the type widely used in the electronics industry for cable shielding. Other types of shielding, however, could be used along with the present invention. Drain wire 20 electrically connects to outer foil shield 14 and normally connects the shield to ground. Outer shield 14 surrounds inner shield 16. Inner shield 16, in turn, surrounds a plurality of conductors 18. Each of the conductors 18 are normally covered with an insulating material to insulate each conductor 18 from each of the other conductors 18. In other words, an insulating material surrounds each individual conductor 18.

Cable 10 is normally rigid and hard to flexibly bend, particularly into a curve with a small radius. The present invention properly shields the end of cable 10 and allows it to be flexibly bent. First, one must remove the desired portion of outer insulating sheath 12 without damaging outer shield 14. At least 18 inches of outer insulating sheath 12 will normally be removed. After outer insulating sheath 12 has been removed, the end of outer shield 14 stands exposed. The point on the end of cable 10 where outer shield 14 is first exposed after a portion of outer insulating sheath 14 has been removed is known as cable butt point 22 as indicated on FIG. 1. The exposed portion of outer shield 14 should be discarded except for four to five inches of outer shield 14 immediately adjacent to cable butt point 22.

Figure 2:
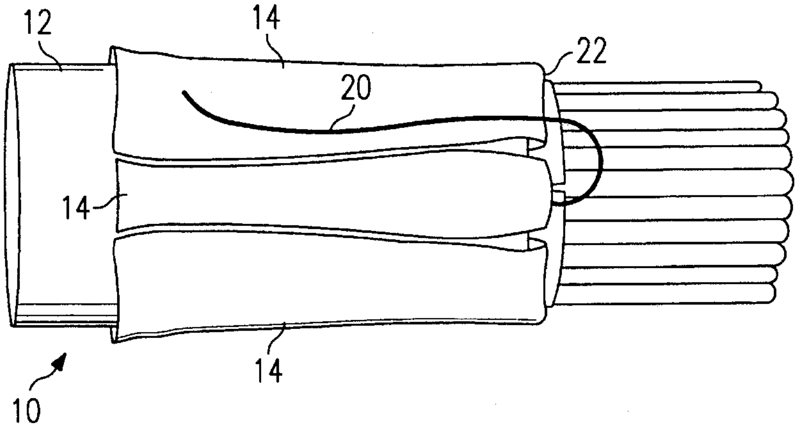
FIG. 2 illustrates the cable of FIG. 1 with a portion of the conducting shield exposed and folded back along the outer sheath of the cable.

Turning now to FIG. 2, the exposed portion of outer shield 14 should be cut to form four parts and folded back along outer insulating sheath 12 as illustrated in FIG. 2. Folding back outer shield 14 reveals inner shield 16 and drain wire 20. The exposed portion of inner shield 16 should be completely removed and all but four to five inches of drain wire 20 measured from cable butt point 22 should be removed. The remaining exposed portion of drain wire 20 then folds back on top of one of the pieces of outer shield 14 as illustrated in FIG. 2.

As noted above, outer shield 14 is a foil shield in the preferred embodiment. The outer surface of a foil shield is normally not conductive, while the inner surface is conductive. Folding back outer shield 14 exposes the inner conducting surface. This provides an optimum electrical contact for connection with the ground strap assembly of the present invention.

Figure 3:
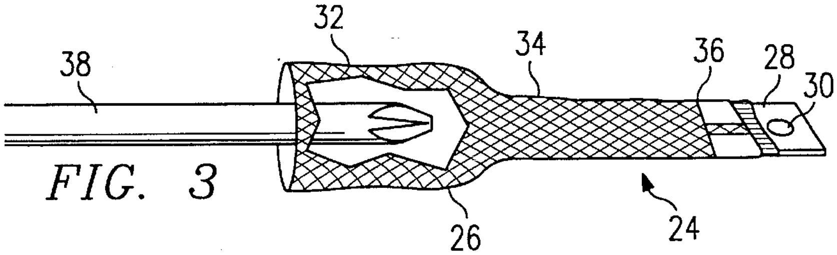
FIG. 3 illustrates the head of a screwdriver being inserted into a ground strap assembly made in accordance with the teachings of the present invention.

FIG. 3 illustrates a ground strap assembly, indicated generally at 24 and constructed in accordance with the teachings of the present invention. Ground strap assembly 24 consists of ground strap 26 and ground strap terminal 28. Ground strap 26 may be constructed of conducting braided material such as that typically used for shielding in the electronics industry. Other materials could be used for ground strap 26 without departing from the teachings of the present invention. Ground strap terminal 28 consists of a conducting terminal electrically coupled to ground strap 26. In the preferred embodiment, ground strap terminal 28 is soldered to the end of ground strap 26. Alternatively, ground strap terminal 26 could crimp to the end of ground strap 26. Ground strap terminal 28 includes an opening 30, allowing ground strap terminal 28 to be inserted onto a grounded bolt in an electronic device.

Ground strap 26 consists of cable end portion 32 which extends to central portion 34. Central portion 34 further extends to grounding portion 36. Grounding portion 36 consists of the portion of ground strap 26 that attaches to ground strap terminal 28.

The braid of ground strap 26 must first expand sufficiently to allow cable 10 to pass through it. As illustrated in FIG. 3, inserting screwdriver 38 into the cable end portion 32 of ground strap 26 can accomplish the expansion. Screwdriver 38 is only one example of a tool that could be used to open up the end of ground strap 26.

Figure 4:
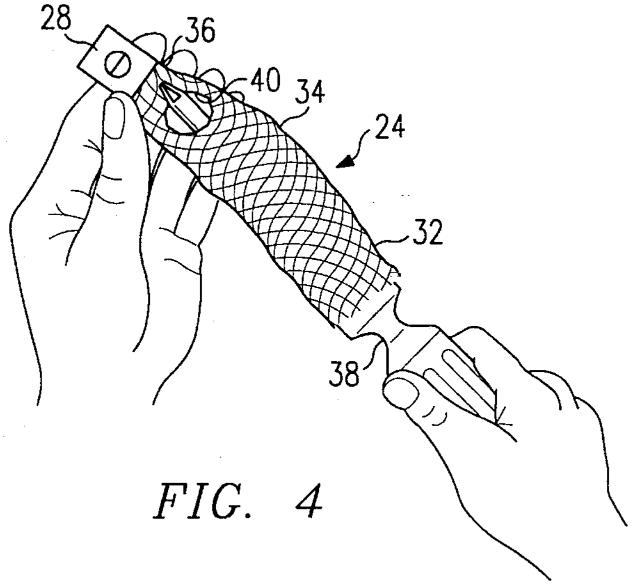
FIG. 4 illustrates a hole being made in the ground strap assembly of FIG. 3.

An opening 40, as illustrated in FIG. 4, is made in ground strap 26 to allow conductors 18 of cable 10 to exit ground strap assembly 24 thereby allowing conductors 18 to be flexibly maneuvered and attached to one or more connection points in an electronic device. Additional openings could be made along ground strap 26 to allow various conductors 18 to exit ground strap assembly 24 at different points along ground strap 26. As FIG. 4 illustrates, opening 40 can be made in ground strap 26 by using screwdriver 38 to poke a hole in ground strap 26 after screwdriver 38 has been inserted inside of ground strap 26. Opening 40 should normally be made in the central portion of ground strap 26 approximately 1½ to 2 inches from ground strap terminal 28. Keeping the hole at least 1½ to 2 inches from ground strap terminal 28 achieves superior EMI shielding, while still allowing grounding portion 36 of ground strap 26 to be easily maneuvered when connecting ground strap terminal 28 to a grounded bolt in an electronic device.

Figure 5:
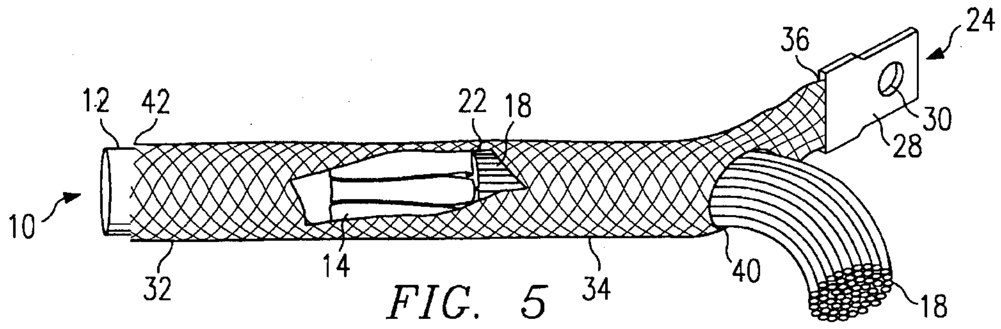
FIG. 5 illustrates the ground strap assembly of FIG. 3 with the cable of FIG. 2 inserted into it.

After creating opening 40 in ground strap 26, cable 10 inserts into ground strap assembly 24 as illustrated in FIG. 5. As cable 10 is inserted, conductors 18 should exit ground strap assembly 24 through opening 40. Cable 10 should be pulled through ground strap assembly 24 until edge 42 of cable end portion 32 of ground strap 26 extends 5 to 6 inches past cable butt point 22, as illustrated in FIG. 5. FIG. 5 shows a cutaway view of ground strap assembly 24, revealing cable butt point 22, conductors 18 and outer shield 14. The cutaway view illustrates how cable 10 has been inserted into ground strap assembly 24. As illustrated, conductors 18 exit from ground strap assembly 24 through opening 40.

After ground strap assembly 24 extends back onto cable 10 far enough, ground strap assembly 24 should be squeezed so as to compress ground strap 26 around cable 10. After ground strap 26 compresses tightly against cable 10, ground strap assembly 24 can be firmly attached to cable 10.

Figure 6:
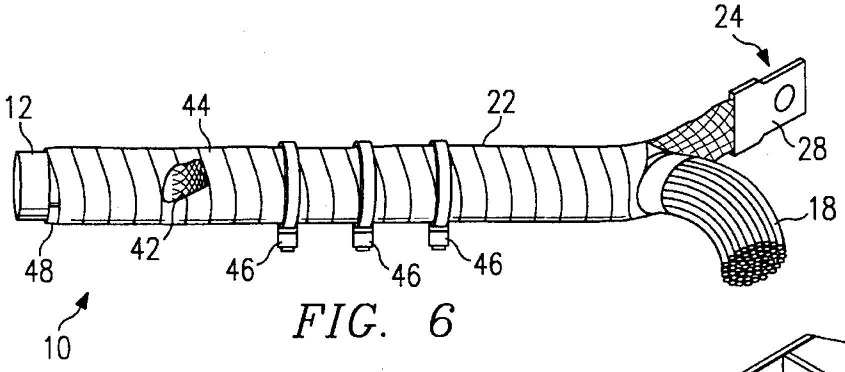
FIG. 6 illustrates the ground strap assembly of FIG. 3 attached to the cable of FIG. 2 using insulated electrical tape and plastic tie wraps.

Referring to FIG. 6, ground strap assembly 24 secures to cable 10 with insulated electrical tape 44 wrapped around a portion of cable 10 and around a large portion of ground strap assembly 24. Additional support results from wrapping one or more tie wraps 46 around the electrical tape 44. Tie wraps 46 are normally made of plastic. Electrical tape 44 and tie wraps 46 are only examples of the types of materials that could be used to attach ground strap assembly 24 to cable 10. Other types of materials, such as heat shrink, could be used to connect ground strap assembly 24 to cable 10 without departing from the teachings of the present invention.

As illustrated in FIG. 6, insulated electrical tape 44 wraps around a portion of cable 10 and ground strap assembly 24 in an overlapping diagonal fashion. The starting point 48 of the tape is approximately two inches beyond edge 42 of ground strap 26. FIG. 6 illustrates a cutaway view showing edge 42 of ground strap 26. Tape 44 wraps around ground strap assembly 24 until the point in ground strap assembly 24 where conductors 18 protrude through opening 40. At this point, without cutting the tape, an additional half inch of tape 44 wraps around the conductors 18 that have exited ground strap assembly 24 through opening 40. After the tape 44 has been attached, three tie wraps 46 should be wrapped tightly around the tape in the area of cable 10 where outer shield 14 has been folded back.

The use of ground strap assembly 24 has numerous advantages. First, ground strap assembly 24 provides a solid electrical connection to outer shield 14, thereby providing superior grounding of outer shield 14 of cable 10. Such a connection also creates superior electromagnetic interference rejection for cable 10. In addition, ground strap assembly 24 provides additional shielding to the ends of conductors 18 between cable butt point 22 and opening 40 of ground strap assembly 24. The additional shielding provides additional protection against electromagnetic interference. Moreover, the use of ground strap assembly 24 allows the end of cable 10 to be flexibly bent in a curve with a tight radius. This makes it easier to attach cable 10 to electronic equipment.

Figure 7:
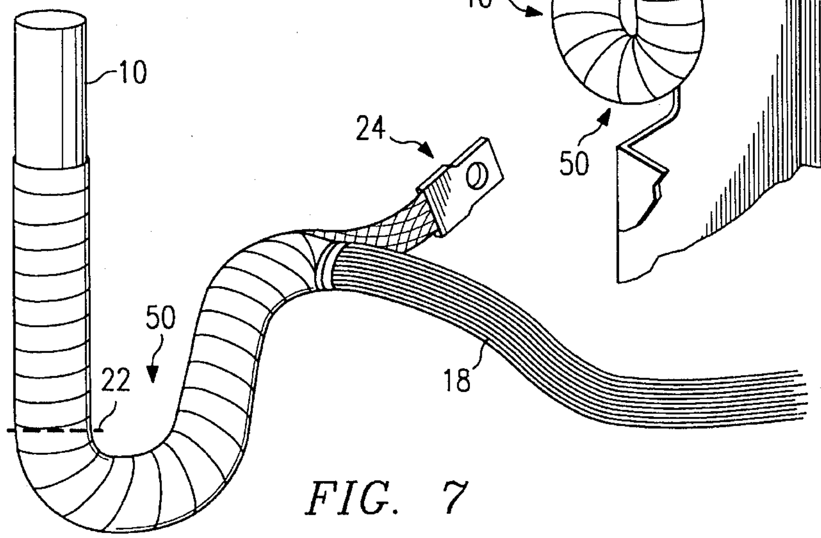
FIG. 7 illustrates the cable of FIG. 2 with the ground strap assembly of FIG. 3 now firmly attached in a drop loop configuration.

As illustrated in FIG. 7, the end of cable 10 has been flexibly bent into a drop loop 50 without damaging the cable. In order to prevent damage to the cable, however, the bend should begin after cable butt point 22. By forming a drop loop 50 in cable 10 with ground strap assembly 24 attached, cable 10 more easily maneuvers and connects to a piece of electronic equipment.

Figure 8:
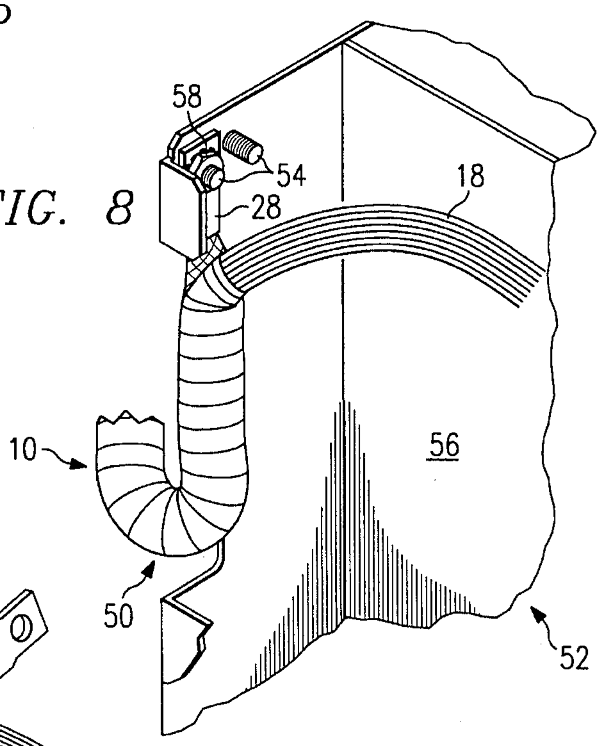
FIG. 8 illustrates the cable of FIG. 2 with the ground strap assembly of FIG. 3 firmly attached wherein the ground strap assembly has been attached to a ground strap lug located on electronic device.

FIG. 8 illustrates the connection of ground strap assembly 24 to ground, thereby providing shielding to cable 10 from electromagnetic interference. As shown in FIG. 8, drop loop 50 has been formed in cable 10 to allow cable 10 to be easily maneuvered for connection to multiplexer/demultiplexer shelf 52. To properly ground ground strap assembly 24, ground terminal 28 passes over one of the ground studs 54 that attach to backplane protective plate 56. Ground strap terminal 28 connects to ground stud 54 by passing opening 30 in ground strap terminal 28 over ground stud 54. In the embodiment illustrated in FIG. 8, ground stud 54 is bolt-like and ground strap terminal 28 is securely fixed in place by using a nut 58. In the preferred embodiment, a KEPS nut 58 secures ground strap terminal 28. After ground strap terminal 28 has been fixed to ground stud 54, conductors 18 may be connected to individual terminals in the multiplexer/demultiplexer shelf 52. Typically, such terminals will be wire-wrap type terminals.

Multiplexer/demultiplexer shelf 52 typically consists of a processing unit (not shown) operable to form one or more multiplexed signals from a plurality of telephone signals and to separate a multiplexed signal into a plurality of demulitplexed signals. The processing unit mounts in a cabinet containing at least one panel with one or more ground studs 54 mounted on a backplane protective plate 56. Multiplexer/demultiplexer shelf 52 also contains a plurality of connection terminals for electrically connecting conductors 18 to the processing unit.

Multiplexer/demultiplexer shelf 52 typically connects to other telephone equipment using cable 10. For example, multiplexer/demultiplexer shelf 52 may connect to a cross-connect panel using a cable 10 shielded with ground strap assembly 24. As another example, multiplexer/demultiplexer shelf 52 may connect to a telephone switching device having a plurality of terminals each connected to one of the conductors 18 in cable 10 wherein the end of cable 10 that connects to multiplexer/demultiplexer shelf 52 has been shielded using ground strap assembly 24.

In alternative embodiments of multiplexer/demultiplexer shelf 52, the shelf may not have wire-wrap terminals, but could have a connector port where a type of electrical connector must be attached to multiplexer/demultiplexer shelf 52. In such a system, ground strap assembly 24 would be used as discussed above. However, rather than attaching each of the conductors 18 to wire-wrap terminals, each conductor would be soldered or crimped into a standard type electrical connector that could then be mated with the corresponding connector port.

Although the operation of the invention has been described in detail, a brief summary may clarify the operation. First, as illustrated in FIG. 2, one prepares cable 10 to receive ground strap assembly 24 by removing a portion of outer insulating sheath 12 and folding back a portion of outer shield 14 and drain wire 20. As illustrated in FIGS. 3 and 4, ground strap 26 gets expanded sufficiently to allow cable 10 to pass through it and opening 40 is created to allow the conductors 18 of cable 10 to exit ground strap 26. Next, cable 10 inserts into ground strap assembly 24 such that the edge 42 of ground strap 26 extends several inches beyond the end of the folded back portion of outer shield 14, as illustrated in FIG. 5. Next, ground strap assembly 24 secures to cable 10 by wrapping electrical tape 44 around cable 10 and ground strap assembly 26. Tie wraps 46 may also be added to provide extra support.

After ground strap assembly 24 has been securely fixed to cable 10, one can configure cable 10 in a drop loop configuration as illustrated in FIG. 7, being careful to bend the cable beyond cable butt point 22. The flexible drop loop configuration allows cable 10 to be easily connected into an electronic device, such as multiplexer/demultiplexer shelf 52 as illustrated in FIG. 8. Connecting ground strap terminal 28 to ground stud 54 shields cable 10 from electromagnetic interference.

Although the present invention and its advantages have been described in detail, it should be understood that various changes, substitutions and alterations can be made therein without departing from the spirit and scope of the invention as defined by the appended claims.

What is claimed is:

1. A ground strap assembly for shielding a cable, the cable comprising a plurality of conductors comprising a plurality of conductor end portions, the plurality of insulated conductors surrounded by a conducting shield comprising a conducting end portion, the plurality of insulated conductors and conducting shield further surrounded by an outer sheath having a sheath end portion, the plurality of conductor end portions and conducting shield end portion extending beyond the sheath end portion and the conducting shield end portion being folded back along the sheath end portion and exposing the plurality of conductor end portions, the ground strap assembly comprising:

a braided conducting ground strap comprising a tubular cable end portion electrically coupling to a central portion, said central portion further electrically coupling to a grounding portion;

wherein said tubular cable end portion is adapted to receive the cable and surrounds and electrically couples to the conducting shield end portion, said tubular cable end portion further surrounding and shielding a predetermined segment of the plurality of conductor end portions; and wherein said central portion comprises an exit opening for receiving and exposing a remaining segment of the plurality of conductor end portions from said braided conducting ground strap thereby allowing the plurality of conductor end portions to be flexibly maneuvered when attaching the plurality of conductor end portions to a plurality of corresponding various connection points of an electronic device; and a ground strap terminal electrically coupled to said grounding portion for attaching and electrically coupling said ground strap to an electrical ground to form a complete electrical path from the conducting shield end portion to the electrical ground, thereby shielding the predetermined segment of the plurality of conductor end portions from electromagnetic interference.

2. The ground strap assembly of claim 1, wherein said central portion comprises a plurality of exit openings for receiving and exposing remaining segments of selected ones of the plurality of conductor and portions from said braided conducting ground strap at various predetermined locations along said central portion, thereby allowing the plurality of conductor end portions to be flexibly maneuvered when attaching the remaining segments of selected ones of the plurality of conductor end portions to a plurality of connection points at corresponding various locations of the electronic device.

3. The ground strap assembly of claim 1, wherein said tubular cable end portion of the cable to be received further comprises a flexible and expandable tube for coupling to the conducting shield end portion by squeezing and moving said tubular cable end portion around the plurality of conductor end portions and the conducting shield end portion.

4. The ground strap assembly of claim 1, further comprising a metal clamp for crimping around said tubular cable end portion and the cable to be received and electrically coupling said tubular cable end portion to the conducting shield end portion.

5. The ground strap assembly of claim 1, wherein said tubular cable end portion further comprises a flexible and expandable tube for coupling to the conducting shield end portion of the cable to be received by squeezing and moving said tubular cable end portion around the plurality of conductor end portions and the conducting shield end portion;

a solder interface for coupling said ground strap terminal to said grounding portion of said braided conducting ground strap; and wherein said central portion comprises a plurality of exit openings for receiving and exposing remaining segments of selected ones of the plurality of conductor end portions of the cable to be received from said braided conducting ground strap at various locations, thereby allowing the plurality of conductor end portions to be flexibly maneuvered when attaching the remaining segments of selected ones of the plurality of conductor end portions to a plurality of corresponding various connection points of the electronic device.

6. A method of electromagnetically shielding a cable comprising a plurality of conductors for providing increased bending flexibility of the cable, said method of shielding comprising the steps of:

providing a cable comprising a plurality of conductors, a conducting shield surrounding the plurality of conductors, and an outer sheath surrounding the conducting shield;

exposing a conducting shield and portion of the conducting shield by removing a sheath end portion from the outer sheath surrounding the rigid cable;

exposing of a plurality of conductor end portions from the plurality of conductors by folding back the conducting shield end portion along the outer sheath;

surrounding a predetermined segment of the plurality of conductor end portions and the conducting shield end portion with a braided conducting ground strap comprising a tubular cable end portion electrically coupling to a central portion comprising at least one exit opening, the central portion further electrically coupling to a grounding portion;

feeding the plurality of conductor end portions into the tubular cable end portion;

securing and electrically coupling the tubular cable end portion to the conducting shield end portion;

feeding a remaining segment of the plurality of conductor end portions through an exit opening in the central portion for the remaining segment of the plurality of conductors to be flexibly maneuvered for attaching to one or more connection points of an electrical device;

connecting and electrically coupling the grounding portion to an electrical ground for shielding the plurality of conductors.

7. The method of claim 6, wherein said folding back step further comprises the steps of removing a predetermined segment of the conducting shield and portion before said folding back step for folding a remaining segment of the conducting shield end portion along the outer sheath.

8. The method of claim 7, wherein the cable further comprises a drain wire electrically connected to the conducting shield and wherein said removing step further comprises the steps of exposing the drain wire by removing a predetermined portion of the drain wire prior to said folding back step; and bending back the drain wire along the conducting shield end portion after said folding back step.

9. The method of claim 6, wherein said grounding portion connecting step further comprises the steps of connecting the grounding portion to a ground strap terminal and connecting the ground strap terminal to a grounding conductor of an electronic device for shielding the plurality of conductor end portions.

10. The method of claim 6, wherein said folding back step further comprises the step of removing a predetermined segment of the conducting shield end portion before said folding back step for folding back a remaining segment of the conducting shield end portion along the outer sheath; and wherein the cable further comprises a drain wire electrically connected to the conducting shield said removing step further comprises the steps of exposing the drain wire by removing a predetermined portion of the drain wire prior to said folding back step and bending back the drain wire along the conducting shield end portion after said folding back step.

11. A cable with a flexible end comprising:

a plurality of insulated conductors comprising a plurality of conductor end portions;

a conducting shield comprising a conducting shield end portion and surrounding the conductors;

an outer sheath comprising a sheath end portion surrounding the conducting shield;

wherein the sheath end portion has been removed to expose said conducting shield end portion and wherein said conducting shield end portion folds back along said outer sheath, thereby exposing the plurality of conductor end portions;

a braided conducting ground strap comprising a tubular cable end portion electrically coupling to a central portion, said central portion electrically coupling to a grounding portion;

wherein said tubular cable end portion receives said plurality of conductor end portions, said conducting shield end portion, and said outer sheath and electrically couples to said conducting shield end portion for shielding a predetermined segment portion of the plurality of conductor end portions; and wherein said central portion comprises an exit opening for receiving and exposing a remaining segment of said plurality of conductor end portions from said braided conducting ground strap thereby allowing said plurality of conductor end portions to be flexibly maneuvered when attaching said plurality of conductor end portions to one or more connection points of an electronic device; and a ground strap terminal electrically coupled to said grounding portion for attaching and electrically coupling said ground strap to an electrical ground and forming a complete electrical path from the conducting shield end portion to the electrical ground, thereby shielding the conductor end portions from electromagnetic interference.

12. The cable of claim 11, further comprising a plurality of exit openings at various locations on said central portion for a remaining segment of selected ones of said plurality of conductor end portions to exit from said central portion at said various locations for said remaining segment of selected ones of said plurality of conductor end portions to flexibly maneuver when attaching said selected ones of said plurality of conductor end portions to one or more connection points of an electronic device.

13. The cable of claim 11, wherein said tubular cable end portion comprises a flexible and expandable tube for electrically coupling to said conducting shield end portion by squeezing and moving said tubular cable end portion around said plurality of conductor end portions said conducting shield end portion, and said outer sheath; and a solder layer for electrically coupling said ground strap terminal to said grounding portion.

14. The cable of claim 11, wherein said conducting shield end portion further comprises a partially removed segment and a folded segment for folding along said outer sheath.

15. A system for connecting telephone switching equipment to a multiplexer/demultiplexer, the system comprising:

a cable comprising:

a plurality of conductors comprising a plurality of conductor end portions;

a conducting shield comprising a conducting end portion and surrounding the conductors;

an outer sheath comprising a sheath end portion and surrounding the conducting shield;

wherein said sheath end portion is removed from said outer sheath to expose said conducting shield end portion and wherein said conducting shield end portion is folded back along said outer sheath for exposing said plurality of conductor end portions;

a braided conducting ground strap comprising a tubular cable end portion electrically coupling to a central portion, said central portion electrically coupling to a grounding portion wherein said tubular cable end portion electrically couples to said conducting shield end portion for shielding a predetermined segment of said plurality of conductor end portions;

wherein said central portion comprises an exit opening for receiving and exposing a remaining segment of said plurality of conductor end portions from said braided conducting ground strap thereby allowing said remaining segment of said plurality of conductor end portions to be flexibly maneuvered when attaching said plurality of conductor end portions to one or more connection points of an electronic device; and a ground strap terminal electrically coupled to said grounding portion for attaching and electrically coupling said ground strap to an electrical ground and forming a complete electrical path from the conducting shield end portion to the electrical ground, thereby shielding the predetermined segment of the plurality of conductor end portions from electromagnetic interference;

a telephone switching device comprising a plurality of terminals, each connected to one of said plurality of conductors;

a multiplexer/demultiplexer shelf for combining a plurality of telephone signals to form at least one multiplexed signals and for separating a multiplexed telephone signal into multiple demultiplexed signals, said multiplexer/demultiplexer shelf comprising a processing unit for generating the multiplexed signals and the demultiplexed signals;

a cabinet containing at least one panel with at least one ground studs mounted thereon for attaching said ground strap terminal, thereby shielding said conductors from electromagnetic interference;

a plurality of connection terminals for electrically connecting said plurality of conductors to said processing unit.

16. The cable of claim 15, wherein said central portion further comprises a plurality of exit openings in various location for selected ones of said remaining segment of said plurality of conductor end portions to exit from said braided conducting ground strap for permitting flexible maneuvering of said remaining segment of said plurality of conductor end portions when attaching said remaining segment of said plurality of conductor end portions to one or more connection points of an electronic device.

17. The cable of claim 15, wherein said tubular cable end portion comprises a flexible and expandable tube for electrically coupling to said conducting shield end portion by squeezing and moving said tubular cable end portion around said plurality of conductor end portions, said conducting shield end portion, and said outer sheath.

18. The cable of claim 15, wherein said tubular cable end portion comprises a flexible and expandable tube for electrically coupling to said conducting shield end portion by squeezing and maneuvering said tubular cable end portion around said plurality of conductor end portions, said conducting shield end portion, and said outer sheath;

a solder layer for electrically coupling said ground strap terminal to said grounding portion; and an aperture in said ground strap terminal for passing over a ground stud of an electronic device for securely attaching the ground strap terminal to to an electrical ground.

19. The cable of claim 15, wherein said conducting shield end portion comprises a folded back partial portion for folding along said outer sheath.

* * * * *